(12) United States Patent
Nellessen, Jr.

(10) Patent No.: US 9,637,994 B2
(45) Date of Patent: May 2, 2017

(54) PRESSURE TOLERANT BATTERY

(71) Applicant: Schlumberger Technology Corporation, Sugar Land, TX (US)

(72) Inventor: Peter Nellessen, Jr., Palm Beach Gardens, FL (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 395 days.

(21) Appl. No.: 13/724,278

(22) Filed: Dec. 21, 2012

(65) Prior Publication Data

US 2013/0175041 A1 Jul. 11, 2013

Related U.S. Application Data

(60) Provisional application No. 61/583,709, filed on Jan. 6, 2012.

(51) Int. Cl.
*H01M 2/10* (2006.01)
*H01M 2/02* (2006.01)
*H01M 10/052* (2010.01)
*E21B 33/035* (2006.01)
*E21B 34/04* (2006.01)
*E21B 49/00* (2006.01)

(52) U.S. Cl.
CPC ........ *E21B 33/0355* (2013.01); *E21B 34/045* (2013.01); *E21B 49/001* (2013.01); *H01M 2/025* (2013.01); *H01M 2/1094* (2013.01); *H01M 10/052* (2013.01); *H01M 2002/0205* (2013.01)

(58) Field of Classification Search
CPC ........... H01M 10/0565; H01M 2/1094; H01M 2/345; H01M 2200/20; H01M 10/445
See application file for complete search history.

(56) References Cited

U.S. PATENT DOCUMENTS

| 5,876,872 | A | 3/1999 | Feezor | |
| 6,293,344 | B1 | 9/2001 | Nixon et al. | |
| 2001/0049049 | A1* | 12/2001 | Hensley et al. | 429/50 |
| 2002/0015894 | A1* | 2/2002 | Wariishi et al. | 429/314 |
| 2003/0183384 | A1 | 10/2003 | Das et al. | |
| 2004/0248001 | A1 | 12/2004 | Hall et al. | |
| 2006/0103357 | A1* | 5/2006 | Johnson | B25F 5/02 320/150 |

(Continued)

FOREIGN PATENT DOCUMENTS

JP 2001307691 A * 11/2001

OTHER PUBLICATIONS

International Search Report and Written Opinion completed on Apr. 29, 2013 for International Patent Application No. PCT/US2013/020091, 11 pages.

(Continued)

*Primary Examiner* — Maria J Laios
*Assistant Examiner* — Robert S Carrico
(74) *Attorney, Agent, or Firm* — Tuesday Kaasch

(57) ABSTRACT

A pressure tolerant battery that may be utilized in a subsea riser includes one or more lithium polymer cells enclosed in a pressure compensated housing. The pressure tolerant battery can be mounted on a landing string a disposed in the riser annulus to provide electrical power to landing string and subsea well system devices.

12 Claims, 3 Drawing Sheets

(56) References Cited

U.S. PATENT DOCUMENTS

2010/0047673 A1* 2/2010 Hirakawa ............ H01M 2/105
 429/54
2011/0120722 A1 5/2011 Scranton et al.

OTHER PUBLICATIONS

AU Application No. 2013206916, Patent Examination Report No. 1, dated Aug. 30, 2016, 4 pgs.
Bluefin Robotics, www.bluefinrobotics.com, 1.5 kWh Subsea Battery, 2 pgs.

* cited by examiner

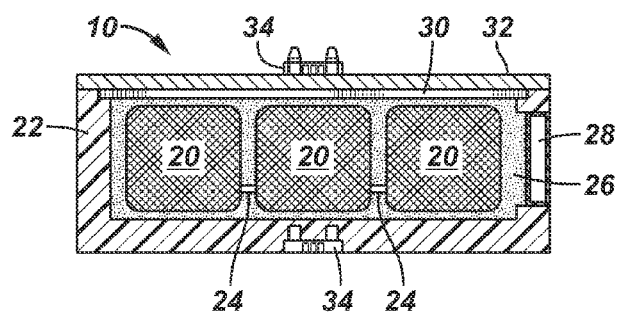
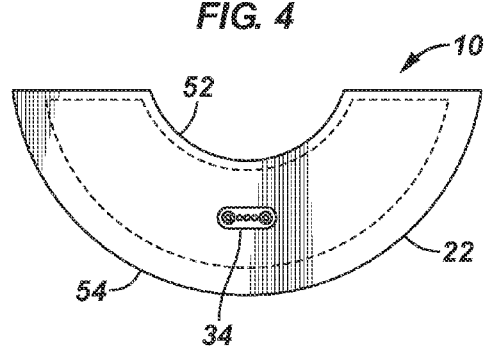
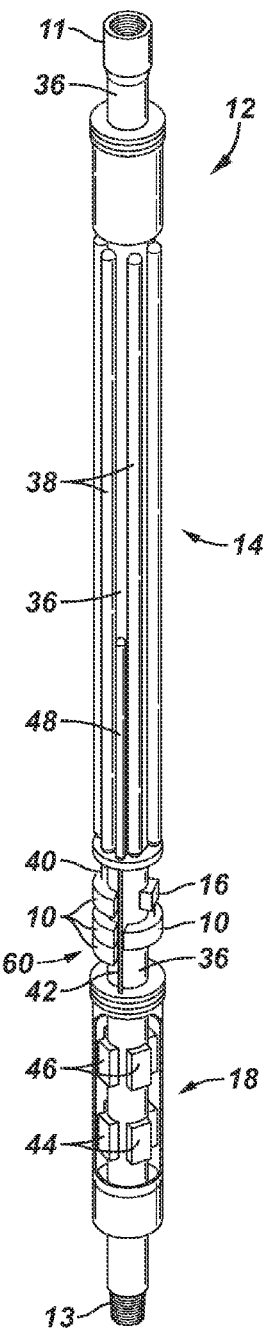

PRESSURE TOLERANT BATTERY

RELATED APPLICATIONS

This application claims the benefit of U.S. provisional application No. 61/583,709 filed on Jan. 6, 2012.

BACKGROUND

This section provides background information to facilitate a better understanding of the various aspects of the disclosure. It should be understood that the statements in this section of this document are to be read in this light, and not as admissions of prior art.

Offshore systems (e.g., lakes, bays, seas, oceans etc.) often include a riser which connects a surface vessel's equipment to a blowout preventer stack on a subsea wellhead. Offshore systems which are employed for well testing operations also typically include a safety shut-in system which automatically prevents fluid communication between the well and the surface vessel in the event of an emergency. Typically, the safety shut-in system includes a subsea test tree which is landed inside the blowout preventer stack on a pipe string. The subsea test tree generally includes a valve portion which has one or more safety valves that can automatically shut-in the well via a subsea safety shut-in system. Hydraulic and electrical power to actuate the valves and devices of the subsea test tree is often communicated from the surface vessel by an umbilical.

SUMMARY

An example of a pressure tolerant battery according to one or more embodiments includes a housing formed in an annular segment having an arcuate shaped inner diameter, a lithium polymer cell enclosed in the housing, and a dielectric fluid disposed in the housing. The pressure tolerant battery may have a pressure compensator disposed in the housing. According to some embodiments the pressure compensator is a bladder. The pressure tolerant battery may have battery control electronics enclosed in the housing.

Embodiments of subsea control systems are disclosed having a mandrel having an internal bore and a pressure tolerant battery mounted on the mandrel, the pressure tolerant battery has a lithium polymer cell disposed in a pressure compensated housing. The pressure tolerant battery may serve as a primary or secondary electric power source for devices of the subsea control system. When the subsea control system is utilized in a subsea well system, the pressure tolerant battery may be a primary or secondary electrical power source for landing string devices and other subsea devices.

An example of a method according to one or more embodiments includes landing a subsea test tree in a blowout preventer stack on a landing string extending through a riser to a water surface. The landing string having a pressure tolerant battery mounted on a mandrel and disposed in an annulus between the riser and the landing string and the pressure tolerant battery having a lithium polymer cell disposed in a pressure compensated housing. The pressure tolerant battery can supply electrical power for example to a subsea electronics module.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

Embodiments of pressure tolerant batteries are described with reference to the following figures. The same numbers are used throughout the figures to reference like features and components. It is emphasized that, in accordance with standard practice in the industry, various features are not necessarily drawn to scale. In fact, the dimensions of various features may be arbitrarily increased or reduced for clarity of discussion.

FIG. 2 illustrates a pressure tolerant battery according to one or more embodiments.

FIG. 3 illustrates an example of a subsea landing string control system according to one or more embodiments.

FIG. 4 illustrates a pressure tolerant battery configured in an annular segment in accordance to one or more embodiments.

DETAILED DESCRIPTION

Figure 1:
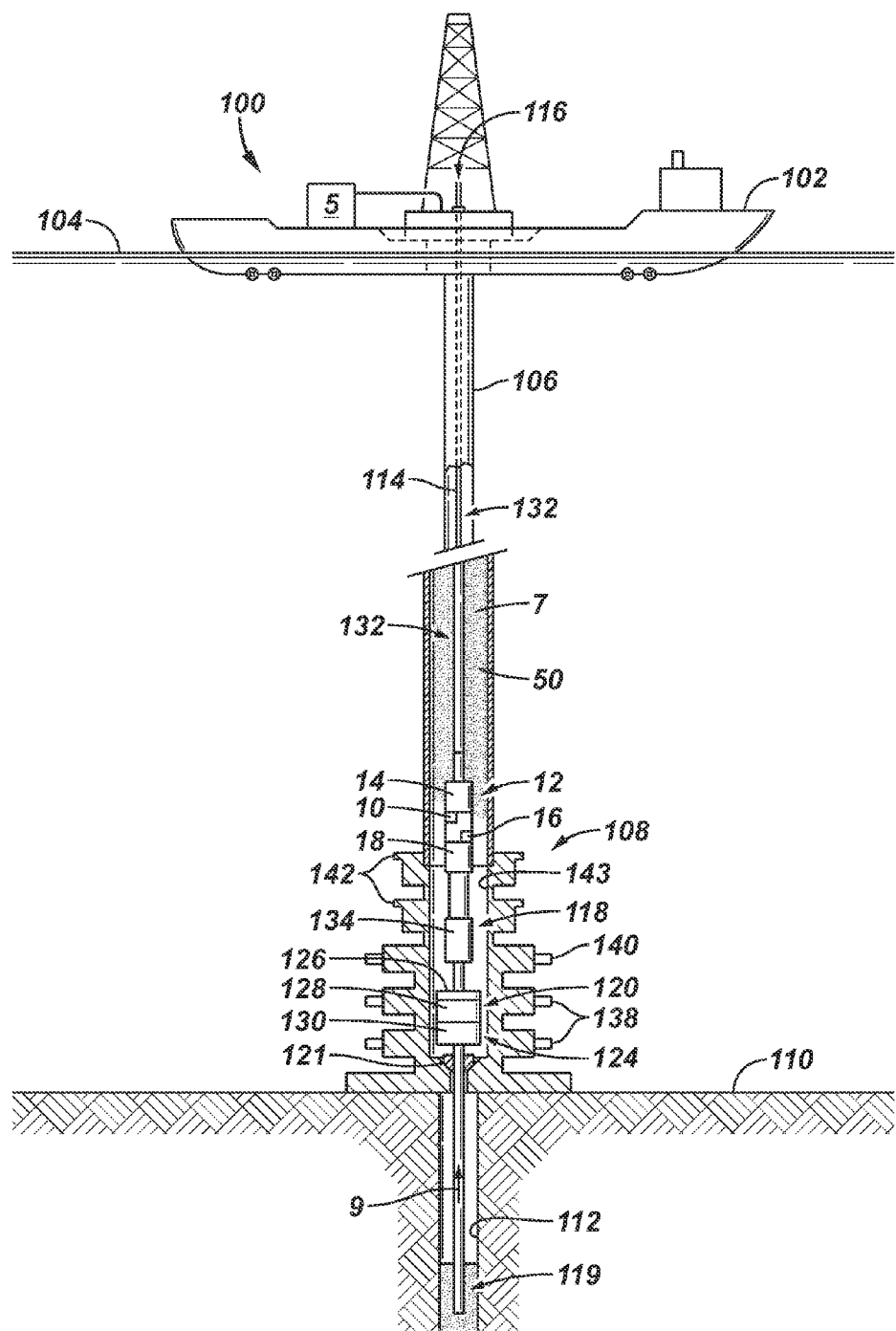
FIG. 1 illustrates an example of a subsea well system implementing pressure tolerant batteries in accordance to one or more embodiments.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms "connect," "connection," "connected," "in connection with," and "connecting" are used to mean "in direct connection with" or "in connection with via one or more elements." Further, the terms "couple," "coupling," "coupled," "coupled together," and "coupled with" are used to mean "directly coupled together" or "coupled together via one or more elements". As used herein, the terms "up" and "down," "upper" and "lower," "top" and "bottom," and other like terms indicating relative positions to a given point or element are utilized to more clearly describe some elements. Commonly, these terms relate to a reference point as the surface from which drilling operations are initiated as being the top point and the total depth being the lowest point, wherein the well (e.g., wellbore, borehole) is vertical, horizontal or slanted relative to the surface.

FIG. 1 illustrates an example of a subsea well system 100 in which embodiments of pressure tolerant batteries, generally noted by the numeral 10, can be implemented. Subsea well system 100 includes a vessel 102 which is positioned on a water surface 104 and a riser 106 which connects vessel 102 to a blowout preventer ("BOP") stack 108 on seafloor 110. A well 112 has been drilled into seafloor 110 and a tubing string 114 extends from vessel 102 through blowout preventer stack 108 into well 112. Tubing string 114 is provided with a bore 116 through which fluids (e.g., formation fluid, drilling fluid) can be conducted between well 112 and surface 104. Although vessel 102 is illustrated as a ship, vessel 102 may include any platform suitable for wellbore drilling, production, or injection operations.

Subsea tree 120 is landed in blowout preventer stack 108 on the upper portion of tubing string 114, referred to herein as landing string 132. A lower portion 119 of tubing string 114 extends into well 112 and is supported by a tubing hanger 121. Subsea tree 120 includes valve assembly 124 and a latch 126. Valve assembly 124 may act as a master control valve during testing of well 112. Valve assembly 124 may include one or more valves, such as flapper valve 128 and a ball valve 130. Latch 126 allows landing string 132 to be disconnected from subsea tree 120, for example during an emergency shutdown. Retainer valve 134 is arranged at the lower end of landing string 132 to prevent fluid in the upper portion of tubing string 114 from draining into the subsea environment when the landing string is disconnected from subsea tree 120. It should be clear that the embodiments are not limited to the particular embodiment of subsea tree 120 shown, but any other valve system that controls flow of fluids through tubing string 114 may also be used. An example of a subsea tree that may be utilized is disclosed in U.S. Pat. No. 6,293,344.

Blowout preventer stack 108 includes pipe rams 138 and shear rams 140. However, other combinations of ram seals may be used. A lower marine riser package may be mounted between blowout preventer stack 108 and riser 106 and may include annular seals 142. The lower marine riser package also typically includes control modules for operating annular preventer seals 142, ram seals 138, 140 in blowout preventer stack 108, and other controls as needed. Blowout preventer stack 108 defines a passage 143 for receiving tubing string 114. Subsea tree 120 is arranged within blowout preventer stack 108 and retainer valve 134 extends from subsea tree 120 into annular rams 142.

Subsea well system 100 includes a safety shut-in system 118 which provides automatic shut-in of well 112 when conditions on vessel 102 or in well 112 deviate from preset limits. Safety shut-in system 118 includes subsea tree 120 and a subsea control system 12 to operate various devices of subsea tree 120 such as, and without limitation, valves 128, 130, retainer valve 134 and latch 126. Subsea control system 12 can be utilized to operate, for example, valves 128, 130 during well testing or other production or injection operations as well during emergency shutdown.

In the illustrated embodiment, subsea control system 12 is a modular unit that includes a subsea hydraulic power unit 14 (e.g., accumulators, pressure/temperature compensators (e.g., volume compensators), and pumps), a subsea electronics module 16 (e.g., electronic processor, electrical circuits), and a hydraulic valve manifold pod 18 (e.g., solenoid operated valves, control valves). Subsea control system 12 may be operationally connected to topside master control station 5. Subsea control system 12 also includes pressure tolerant batteries 10 that may provide a primary or secondary source of electrical power for one or more devices (e.g., processors, sensors, valves, and pumps) of subsea well system 100 including subsea control system 12. The modular units can be connected within landing string 132 to form a continuous axial bore 116 between vessel 102 and well 112. According to one or more embodiments, pressure tolerant batteries 10 are mounted within the annulus 50 between riser 106 and landing string 132. For example, pressure tolerant batteries 10 are mounted on the exterior of landing string 132, i.e., tubing string 114. Pressure tolerant batteries 10 may be mounted in various manners including straps, bolts, welding, and the like.

Pressure tolerant battery 10 may be used in cooperation with existing components and control systems. For example, embodiments of pressure tolerant batteries 10 may be employed with the SenTURIAN Deep Water Control System manufactured by Schlumberger Corporation and the SenTURIAN Subsea landing string electrohydraulic operating system.

Refer now to FIG. 2, schematically illustrating an example of an embodiment of a pressure tolerant battery 10. Pressure tolerant battery 10 includes one or more lithium polymer cells 20 disposed within a housing 22. For example, cells 20 are illustrated electrically connected to one another by conductors 24 in FIG. 2. In accordance with one or more embodiments, cell 20 includes a lithium polymer electrolyte formed in a pouch with an anode and a cathode. Although cells 20 are illustrated as being positioned side-by-side, cells 20 may be disposed vertically, i.e., stacked on top of each other.

The number and connection of cells 20 determine both the battery voltage and capacity depending on the electrical series or parallel arrangement of cells 20. Interconnected cells 20 are disposed in housing 22 and housing 22 is filled with a dielectric fluid 26 (e.g., oil). In accordance with at least one embodiment, the entire volume of housing 22 is pressure compensated. In the depicted embodiment, a pressure compensator 28 is disposed in housing 22. In the depicted embodiment, pressure compensator 28 is a bladder. In accordance with some embodiments, housing 22 and thus pressure tolerant battery 10 may be operationally connected with an external pressure compensator, e.g., pressure compensator 48 illustrated in FIGS. 3 and 5.

In the depicted embodiment, pressure tolerant battery 10 includes battery control electronics 30. Battery control electronics 30 is disposed (i.e., enclosed) in the pressure compensated interior of housing 22. Battery control electronics 30 may be mounted on a wall 32 of housing 22. In the depicted embodiment, wall 32 is a top wall of housing 22. However, wall 32 may be a top, bottom or side wall of housing 22. Battery control electronics 30 may control and monitor the signal voltages, temperature and current and may be utilized to charge battery 10 (i.e., cells 20). For example, a downhole electric power generating device (e.g., a turbine) may be connected to pressure tolerant battery 10. Housing 22 may be constructed of various materials (e.g., metals, plastics, ceramics) in accordance with the environment in which the battery is to be utilized. Housing 22 may be constructed of a single material or different portions may be constructed of different materials. For example, according to at least one embodiment, wall 32 is constructed of an anodized aluminum plate to serve at least in part as a heat sink. The other portions of housing 22 may be constructed for example of a plastic, stainless steel, or titanium to resist the effects of riser fluids 7 within annulus 50. According to some embodiments, housing 22 may be temperature insulated to protect cells 20 from the hot fluids, for example reservoir fluid 9 (FIG. 1) flowing from well 112 through bore 116 of tubing string 114 to surface 104. For example, housing 22 may be constructed of a temperature insulating material and/or include temperature insulating material.

Figure 5:
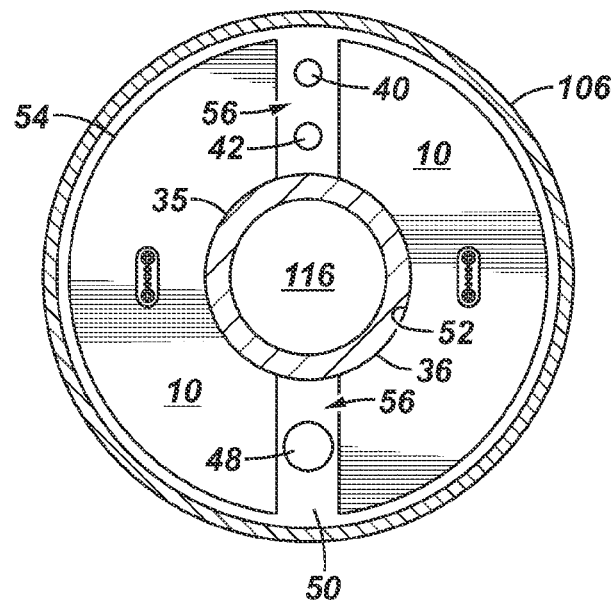
FIG. 5 illustrates pressure tolerant battery mounted on a mandrel and located in a riser annulus in accordance to one or more embodiments.

Pressure tolerant battery 10 may include one or more electrical connectors 34 (e.g., wet connect, plug-and-play connectors). In the example illustrated in FIG. 2 pressure tolerant battery 10 includes a first electrical connector 34 located on an opposite side of housing 22 from a second electrical connector 34. Electrical connectors 34 may be utilized to electrically connect (i.e., series, parallel) two or more pressure tolerant batteries 10 and to connect pressure tolerant batteries 10 to the electrical devices of subsea well system 100 via external cables, for example electrical cable system 40 (FIGS. 3, 5). As will be understood by those skilled in the art with benefit of this disclosure, each pressure tolerant battery 10 may include one or more electrical connectors 34 and electrical connector 34 may be positioned on any side of housing 22. Pressure tolerant lithium batteries and components can be obtained from Bluefin Robotics Corporation, 553. South Street, Quincy, Mass. 02169, USA.

FIG. 4 is an end view of a pressure tolerant battery 10 adapted for mounting laterally with a tubular mandrel, e.g., landing string 132, to be disposed in a riser annulus 50 of a subsea well system 100 (see, e.g., FIG. 1). Housing 22 is formed in an annular segment, i.e., as a segment of an annular ring, having an arcuate, concave shaped inner diameter 52 and an outer diameter 54.

Refer now to FIG. 3 illustrating an example of a subsea control system 12 incorporating one or more pressure tolerant batteries 10. In the depicted embodiment, subsea control system 12 includes a plurality of sections mounted about a mandrel 36 for electro-hydraulically operating a landing string. Subsea control system 12 is adapted to be connected in tubular string 114 to form a portion of landing string 132 (FIG. 1). For example, mandrel 36 includes connector ends 11, 13 for threadedly connecting in tubular string 114.

The depicted subsea control system 12 includes hydraulic power unit 14 which may include a plurality of hydraulic accumulators 38, subsea electronics module 16, and hydraulic valve manifold pod 18. The sections may be individually connected about mandrel 36 and operationally interconnected for example by electrical cables 40 and hydraulic conduits 42. As depicted in FIG. 3, pressure tolerant batteries 10 are mounted to the exterior of mandrel 36. According to one or more embodiments, pressure tolerant batteries 10 are be formed in annular segments, as more clearly shown in FIG. 4, as opposed to a complete annular ring so as to be laterally installed on mandrel 36 as opposed to being slid onto mandrel 36. Accordingly, pressure tolerant batteries 10 can be laterally removed from and installed on mandrel 36 after devices such as hydraulic accumulators 38, subsea electronics module 16, hydraulic valve manifold pod 18, and pressure compensator 48 are mounted with mandrel 36. Pressure tolerant batteries 10 can be mounted on mandrel 36 with various connection devices including without limitation, straps, brackets, tack welding housing 22, and adhesives. As will be understood by those skilled in the art with benefit of this disclosure, pressure tolerant batteries 10 may be physically located in battery banks 60 and/or electrically connected in battery banks 60.

Figure 6:
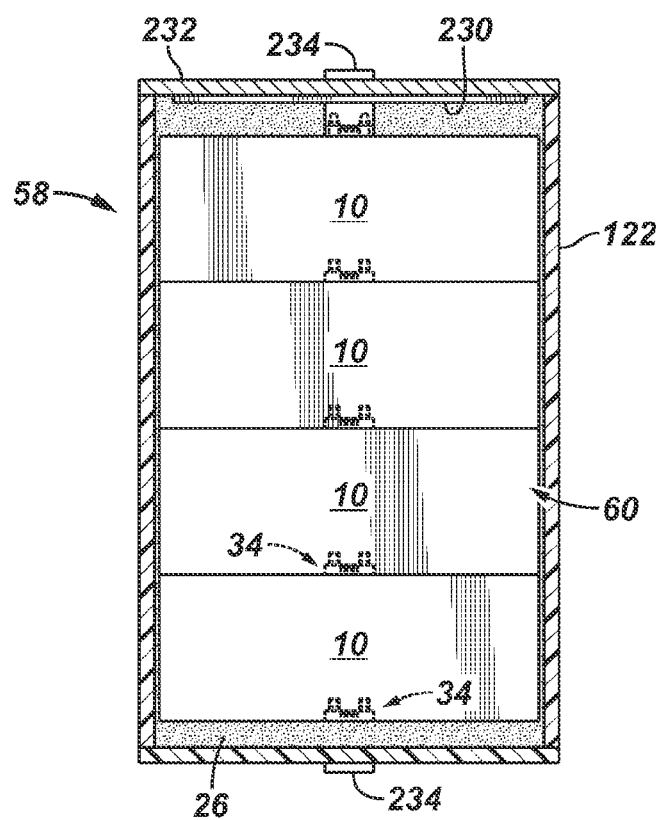
FIG. 6 illustrates an example of a pressure tolerant battery assembly in accordance to one or more embodiments.

As illustrated in FIGS. 3 and 5, pressure tolerant batteries 10 are not enclosed for example in a pressure vessel. Accordingly, when installed in subsea well system 100, pressure tolerant batteries 10 are exposed to riser fluids 7 (FIG. 1). In accordance with some embodiments, multiple pressure tolerant batteries 10 may be enclosed within an outer housing, for example as illustrated in FIG. 6.

Subsea electronics module 16, which can be powered by one or more pressure tolerant batteries 10, may receive electronic signals from topside master control 5 and operate, for example, directional valves 44 and/or solenoid operated valves 46. Valves 44, 46, may be utilized for example to direct hydraulic fluid from hydraulic accumulators 38 to actuate valves 128, 130. Hydraulic valve manifold pod 18 may include filters, relief valves, and other components mounted within an oil-filled pressure compensated enclosure. The pressure compensation may be provided by a hydrostatic pressure compensator 48 (i.e., volume compensator).

FIG. 5 is a sectional view through a riser 106 and an electrical storage module of subsea control system 12 in accordance to one or more embodiments. FIG. 5 depicts a pair of pressure tolerant batteries 10 mounted with mandrel 36 and located in riser annulus 50 between mandrel 36 and riser 106. In the depicted embodiment, inner diameter 52 of each of the pressure tolerant batteries 10 is abutting the exterior surface 35 of mandrel 36.

With additional reference to FIGS. 1 and 3, pressure tolerant batteries 10 are positioned circumferentially about mandrel 36 and spaced apart to define at least one gap 56 between them through which components of subsea well system 100 may be disposed. Two gaps 56 are formed between the ends of the circumferentially adjacent pressure tolerant batteries 10 in the FIG. 5 example. Electrical cable 40 and hydraulic conduit 42 are illustrated passing through one of the gaps 56. Electrical cable 40 may connect one or more pressure tolerant batteries 10 in series or in parallel with for example subsea electronic module 16, valves 44, 46, and/or other electrically powered devices of subsea well system 100. Pressure compensator 48 is illustrated disposed in the second gap 56 of the FIG. 5 embodiment and may be operationally connected for example to hydraulic valve manifold pod 18.

FIG. 6 is a schematic illustration of two or more pressure tolerant batteries 10 configured in a battery assembly 58. In the depicted embodiment, a plurality of pressure tolerant batteries 10 are disposed within a housing 122. Outer housing 122 is filled with dielectric fluid 26 and housing 122 may be pressure compensated, for example, by connection with compensator 48 (FIGS. 3, 5). The enclosed pressure tolerant batteries 10 may be electrically connected to one another for example via electrical connectors 34 to form a battery bank 60. A battery bank 60 is not limited to interconnected pressure tolerant batteries 10 that are disposed within an outer housing 122, but also includes two or more pressure tolerant batteries 10 that are physically positioned together on mandrel 36 (FIG. 3) and/or that are electrically connected together. Battery bank 60 as illustrated in FIG. 6 may be electrically connected via external connector 234 for example to battery assemblies 58, and electrical cables 40 (FIG. 3, 5).

Battery assembly 58 may include battery control electronics 230 disposed within the pressure compensated housing 122. For example, battery control electronics 230 is illustrated mounted to a wall 232 in FIG. 6. Battery control electronics 230 may be connected to the enclosed pressure tolerant batteries 10 for charging and to monitor for example, temperature, voltage, current and the like. In accordance with embodiments, housing 122 may not be a pressurized containment vessel. Battery assembly 58 may provide additional temperature insulation for the enclosed pressure tolerant batteries 10. Outer housing 122 may be formed in an annular segment, for example as described with reference to the pressure tolerant battery 10 illustrated in FIG. 4, having an inner diameter 52 for mounting against the exterior of a tubular string mandrel and an outer diameter 54.

Lithium polymer batteries have a relatively limited operating temperature range. For example, during well flow back conditions the temperatures in bore 116 of tubing string 114 may increase the temperature in riser annulus 50 above the maximum operating range of lithium polymer cells 20. Circulation of dielectric fluid 26 in housing 22 of individual pressure tolerant batteries 10 and/or in outer housings 122 may aid in transferring heat from the hotter inner diameter 52 side of the respective housing 22, 122 to the cooler outer diameter side 54 of the respective housing 22, 122.

The foregoing outlines features of several embodiments of pressure tolerant batteries used in subsea risers so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A pressure tolerant battery system, comprising:
    first and second housings, each formed in an annular segment having an arcuate shaped inner diameter configured to be positioned at least partially around a mandrel, wherein the first and second housings are circumferentially-offset from one another, wherein first and second gaps are defined circumferentially-between the first and second housings, and wherein a first portion of each housing comprises an anodized aluminum plate, and a second portion of each housing comprises plastic, stainless steel, titanium, or a combination thereof;
    a lithium polymer cell disposed in each housing, wherein the lithium polymer cell has an arcuate shaped inner diameter;
    a dielectric fluid disposed in each housing;
    battery control electronics disposed in each housing and coupled to the anodized aluminum plate; and
    a pressure compensator positioned in the first gap.

2. The pressure tolerant battery system of claim 1, wherein the pressure compensator comprises a bladder.

3. The pressure tolerant battery system of claim 1, wherein the battery control electronics in the first housing cause the dielectric fluid in the first housing to circulate to transfer heat radially-outward from the arcuate shaped inner diameter of the first housing toward an arcuate shaped outer diameter of the first housing.

4. The pressure tolerant battery system of claim 3, wherein the battery control electronics in the first housing control and monitor signal voltages, current, and temperature, and wherein the battery control electronics in the first housing are used to charge the lithium polymer cell in the first housing.

5. The pressure tolerant battery system of claim 1, wherein the second portion of each housing comprises plastic.

6. The pressure tolerant battery system of claim 1, wherein the second portion of each housing comprises stainless steel.

7. The pressure tolerant battery system of claim 1, wherein the second portion of each housing comprises titanium.

8. The pressure tolerant battery system of claim 1, wherein the battery control electronics is configured to facilitate a downhole turbine in charging the lithium polymer cell.

9. The pressure tolerant battery system of claim 1, further comprising:
    an electrical cable positioned in the second gap, wherein the electrical cable is coupled to the lithium polymer cell in the first housing; and
    a hydraulic conduit positioned in the second gap.

10. A method, comprising landing a subsea test tree in a blowout preventer stack on a landing string extending through a riser to a water surface, wherein the landing string comprises a pressure tolerant battery system mounted on a mandrel and disposed in an annulus between the riser and the landing string, the pressure tolerant battery system comprising:
    first and second pressure compensated housings, each formed in an annular segment having an arcuate shaped inner diameter configured to be positioned at least partially around the mandrel, wherein the first and second pressure compensated housings are circumferentially-offset from one another, wherein first and second gaps are defined circumferentially-between the first and second pressure compensated housings, and wherein a first portion of each pressure compensated housing comprises an anodized aluminum plate, and a second portion of each pressure compensated housing comprises plastic, stainless steel, titanium, or a combination thereof;
    a lithium polymer cell disposed in each pressure compensated housing, wherein the lithium polymer cell has an arcuate shaped inner diameter;
    a dielectric fluid disposed in each pressure compensated housing;
    a battery control electronics disposed in each pressure compensated housing and coupled to the anodized aluminum plate; and
    a pressure compensator positioned in the first gap.

11. The method of claim 10, wherein the battery control electronics in the first pressure compensated housing cause the dielectric fluid in the first pressure compensated housing to circulate within the first pressure compensated housing to transfer heat from the arcuate shaped inner diameter of the first pressure compensated housing toward an arcuate shaped outer diameter of the first pressure compensated housing.

12. The method of claim 10, wherein the pressure tolerant battery system comprises a second pressure compensator disposed in the first pressure compensated housing.

* * * * *